United States Patent [19]

Cassidy et al.

[11] Patent Number: 5,748,813
[45] Date of Patent: May 5, 1998

[54] FREE SPACE OPTICAL COMMUNICATION SYSTEM

[75] Inventors: Stephen Anthony Cassidy, Suffolk; Peter Paul Smyth, Woodbridge; Douglas Lawrence Williams; Trevor Keith White, both of Suffolk, all of United Kingdom

[73] Assignee: British Telecommunications pubic limited company, London, England

[21] Appl. No.: 379,449

[22] PCT Filed: Jul. 28, 1993

[86] PCT No.: PCT/GB93/01590

§ 371 Date: Mar. 28, 1995

§ 102(e) Date: Mar. 28, 1995

[87] PCT Pub. No.: WO94/02997

PCT Pub. Date: Feb. 3, 1994

[30] Foreign Application Priority Data

Jul. 28, 1992 [EP] European Pat. Off. .............. 92306885

[51] Int. Cl.⁶ .................................................. G02B 6/28
[52] U.S. Cl. ............................................................ 385/24
[58] Field of Search ................................... 359/172, 173; 385/24, 147

[56] References Cited

U.S. PATENT DOCUMENTS 4,929,050  5/1990  Wilson ......................................... 385/12

FOREIGN PATENT DOCUMENTS

| 0188085 A2 | 5/1985 | European Pat. Off. . |
| 0188085 | 7/1986 | European Pat. Off. .................. 385/24 |
| 0398181 | 11/1990 | European Pat. Off. .................. 385/24 |
| 54-95104 | 7/1979 | Japan . |
| 55-99855 | 7/1980 | Japan . |
| 57-2005 | 7/1982 | Japan . |

OTHER PUBLICATIONS

Patent Abstracts of Japan, vol. 13, No. 497 (M–889) 1989 & JP,A,01 197 902 (ASAHI GLASS).

Achurch, "Optical Tap Based on D–Fibre", Electronics Letters, vol. 26, No. 22, 25 Oct. 1990, Stevenage GB, pp. 1909–1910.

Smyth et al, "Optical Wireless Local Area Networks— Enabling Technologies", BT Technol J. vol. 11, No. 2, Apr. 1993, pp. 56–64.

Zyskind et al., "Erbium–Doped Fiber Amplifiers and the Next Generation of Lighwave Systems", 8010 AT&T Techical Journal , 71 (1992) Jan./Feb., No. 1, Short Hills, NJ, US, pp. 53–62.

Closs et al, "Wireless Connection Between A Controller and a Plurality of Terminals", IBM Technical Disclosure Bulletin, vol. 20, No. 7, Dec. 1977, p. 2843.

Primary Examiner—Akm E. Ullah
Attorney, Agent, or Firm—Nixon & Vanderhye P.C.

[57] ABSTRACT

An optical communication system for free space communication includes an optical source including a modulator to modulate the optical output to provide an optical signal. The optical source is connected to an optical fiber to pass the signal therealong. The optical fiber includes an antenna having an optical fiber transmit portion with a core, and a cladding, the cladding including at least one substantially flat surface extending along its length and arranged to couple light out of the optical fiber through the substantially flat surface(s). A scattering structure scatters into free space light thus coupled out of the fiber.

35 Claims, 5 Drawing Sheets

FREE SPACE OPTICAL COMMUNICATION SYSTEM

BACKGROUND OF THE INVENTION

1. Field of the Invention

The present invention relates to optical communication systems.

2. Related Art

It is well known to use, for example, an infrared source to pass information, for example, a television remote control apparatus, or an infrared transmission system in a theatre for transmitting signals to a headset receiver for use, for example, by people with impaired hearing. Optical free-space transmission is the new alternative to radio and microwave communications for future mobile computer networks. It is capable of offering far greater bandwidth and, where it is used inside rooms where it is used, it does not interfere with other systems. These new infra-red communications systems could be based on very low-cost consumer optoelectronic components such as 850 nm sources and silicon detectors. The projected cost of optical free-space wireless systems is therefore much lower than microwave-based systems. Low cost is fundamental to mass exploitation of communication systems for use with mobile computers.

There are, however, several problems with such systems. Firstly they require power to be provided to the transmitter itself, and secondly, in some circumstances, it may be possible by the use of a lens, for example a binocular lens, (the diameter of the lens is defined in the standard to be 50 mm) to focus the infrared radiation from the transmitter on to the skin, or worse still, the retina and to possibly damage the skin or retina.

An important factor is the size of the optical source—the lens of the eye may focus the light from a point source to a small intense spot on the retina, whilst the same optical energy from a large area source will give a much larger spot on the retina and will thus result in less of a hazard.

Various national and international standards on the safety of lasers (such as IEC825 [2]) specify what optical emission levels from lasers should be considered as safe. In these standards, products are classified according to the hazard, with class 1 being defined as inherently safe (even when viewed with optical instruments such as binoculars). It will be necessary for optical wireless applications to fall into this category.

The increasing exploitation of wavelengths in the near-infra-red range for communications and other applications has stimulated more detailed examination of the biological damage levels for these wavelengths. The relevant optical wavelengths for LAN systems are about 850 nm, 1300 nm, 1480 nm and 1550 nm or other wavelengths where suitable emitter and detector components are available. In general, the maximum safe-power levels will be relatively low, near the visible part of the spectrum, because the eye is particularly efficient at focusing and absorbing the radiation. At wavelengths greater than 1400 nm the retina is less at risk, but skin damage is still possible. Proposed changes, in Amendment 2 of IEC825, will incorporate relaxations to the safe-power levels at the relevant wavelengths. These changes will result in increases in maximum power for class 1 at 850 nm from 0.24 mW to 0.4 mW, at 1300 nm from 0.6 mW to 8 mW, and at 1480 nm and 1550 nm from 0.8 mW to 10 mW. In addition, further analysis of the effect of light from large area sources has resulted in a new, more accurate, method of assessing the hazard, which is also planned to be included in Amendment 2.

Reference may be made to our copending EP 521 710A which is hereby incorporated by reference.

SUMMARY OF THE INVENTION

The present invention provides an optical communication system for free space communication comprising an optical source including means to modulate the optical output to provide an optical signal, said optical source being connected to an optical fibre to pass said signal therealong, the optical fibre including antenna means comprising an optical fibre transmit portion comprising a core, and a cladding, said cladding including at least one substantially flat surface extending along its length and means to couple light out of the optical fibre through said substantially flat surface(s), and scattering means to incoherently scatter into free space light thus coupled out of the fibre.

Preferably that said optical fibre transmit portion includes a coating surrounding said cladding.

Preferably the distance between said core and said surface and the relative refractive indices of the cladding and the coating is such that said optical signal from the optical fibre transmit portion is scattered into free space to provide incoherent scattered light outside the fibre.

Preferably the light from within the optical fibre is scattered through an angle of more than 90° to the direction of passage of light along the fibre.

Preferably the antenna means includes means to further incoherently scatter the light into free space.

Preferably the further scattering means includes a diffuser in the form of a diffuse screen or scattering lens elements.

Preferably said scattering lens elements are lenticular elements formed by spraying transparent material on to at least one of said at least one flat surface and allowing individual droplets to set.

Preferably the further scattering means comprises glass beads.

Preferably the further glass beads have diameters in the range 3 to 18 μm.

Preferably the coating is transparent to said light and said glass beads are provided within the coating on the outer surface of the coating or both.

Preferably the further scattering means comprises irregularities in the core of the fibre.

Preferably the irregularities comprise small crystals within the fibre core which provide Rayleigh scattering.

Preferably the further scattering means comprises a holographic element.

Preferably said holographic element is formed on at least one of said substantially flat surfaces of said fibre.

Preferably a plurality of said optical fibre transmit portions are provided at spaced intervals along the optical fibre.

Preferably said spaced optical fibre transmit portions are arranged so that, successive portions are arranged to transmit an increasing proportion of the available light in the fibre whereby the amount of light transmitted by each portion is substantially the same.

Preferably the optical fibre transmit portion is between 1 and 100 m in length.

Preferably the optical fibre transmit portion is between 1 and 10 m in length.

Preferably the optical source is arranged to transmit 10 mW to 1 W of light along the optical fibre.

Preferably the optical fibre includes a dopant capable when stimulated of amplifying the signal from the source as the signal travels along the fibre.

Preferably the optical source and a pump source are connected to the fibre through a wavelength multiplexer the pump source providing a signal at a shorter wavelength than the signal from the optical source to stimulate the dopant in the fibre.

Preferably the source is a laser having a power output up to 200 mW and in that the light transmitted from the optical communication system is arranged so that it is not possible, with a lens of up to 50 mm diameter, to form the light to provide an energy density sufficient to damage a human as defined.

Preferably the distance (d) between the periphery of said core and said substantially flat surface of the cladding is approximately 5 µm.

Preferably the distance (d) between the periphery of said core and said substantially flat surface of the cladding is approximately 5 µm.

Preferably said cladding is surrounded by a coating of diameter in the range 250 to 400 µm.

The invention also provides an optical communication system for free space communication comprising an optical source, including means to modulate the optical output from said source to provide an optical signal, said optical source being connected to an optical fibre to pass said signal thereto, the optical fibre including signal transmit means comprising an optical fibre transmit portion comprising a core, and cladding, the core including optically effective irregularities whereby some of said optical signal from the optical fibre transmit portion is scattered through the cladding to provide incoherent scattering into free space outside the fibre.

Preferably said irregularities comprise small crystals within the fibre core which provide Rayleigh scattering.

For the first time, the inventors have appreciated that in order to meet the safety requirement, it is desirable to (a) provide an extended source so that even with the use of, for example, a focusing lens, it is not possible to focus the light from the extended source so as to provide an energy density of radiation sufficient to damage a human (ie, less than 0.4 mW, preferably less than 0.24 mW at 850 nm, less than 8 mW, preferably less than 0.6 mW at 1300 nm, less than 10 mW, preferably less than 0.8 mW at 1480–1550 nm) and (b) to provide incoherent scattering of the transmitted light so that there are no untoward concentrations of light transmitted to any spatial point.

The use of an extensive source prevents light from all points along that extensive source being brought to a spot by any focusing means in a practical environment. If, for example, the extensive source is a meter long and across the ceiling of a typical room, say 2.5 meters above desk height, then the light from the extensive source cannot be brought to a spot. An image must be formed. The size of the image of the extensive source will depend upon the focal length of the lens in question. Generally speaking, the ratio of the size of the image of the extensive source itself to the size of the extensive source itself will be the same as the ratio of the focal length of the lens to the distance from the lens to the extensive image. To produce an image which can be brought within the pupil of an eye would require a lens, in these circumstances of extremely short focal length and therefore of very limited aperture. As a result, the amount of energy which can be collected by such a small lens is very limited. In other words, for larger sources, the power density on the retina, and thus the hazard, will depend on the power density incident on the cornea and the size of the source in terms of the angle subtended by the optical source at the eye. A more appropriate measure of light for safety purposes for these large sources is the radiance ($W/m^2/ster$) of the source. As it is not possible for the radiance to be increased using an optical instrument, this value is a more fundamental measure with which to assess safety. For the wavelength 850 nm, the maximum safe radiance for continuous viewing (IEC825) is 12.8 $kW/m^2/ster$. Assuming a large area Lambertian source (the distribution expected from a perfect diffuser), the radiance, L ($W/m^2/ster$), is related to the power density on the emitting surface, H ($W.m^2$), by $L=H/\pi$.

Therefore the maximum safe power density on the emitting surface will be 41 $kW/m^2$. For sources which give distributions of power that are different from Lambertian, this power density will be scaled according to the total solid angle covered.

A value of 41 $kW/m^2$ would appear to be very large to be considered as eye-safe, especially as it exceeds the MPE level for skin damage, 2 $kW/m^2$. Recently, there have been suggestions that the conditions specified in IEC825 underestimate the hazard for large sources. New proposals for dealing with large sources will appear in Amendment 2, and are likely to reduce this value considerably. Initial proposals indicate that the maximum safe power density from a Lambertian source for continuous viewing at a wavelength of 850 nm could be as low as 0.37 $kW/m^2$.

One way of providing an extended source is to use a D-fibre. This fibre is produced by removing a portion of the circular cladding at the fibre preform stage to give a D-shaped cross section with the core close to the flat of the "D". When the fibre is drawn the D-shape is maintained, and long lengths of fibre can be fabricated with the core only a matter of microns below the flat surface. Optical power is guided by this structure with low loss, providing the material in contact with the flat of the D-fibre has a lower reflective index than that of the fibre core. If a material with higher index meets the flat surface, light will couple from the core into the material overlaid. The rate at which the light couples out with distance is determined primarily by the distance from the core to the flat of the D-fibre. The refractive index of the overlay material determines the angle at which the light emerges, and, to a lesser extent, the coupling rate.

The overlay material can be formed by microlens or scattering surfaces on the D-fibre flat. The emergent optical power can be made to cover wide angles with different inclinations to the fibre surface according to the application. The scattering features can be incorporated into the fibre or overlay materials themselves. These overlay materials may simply form the fibre coatings.

Amplifiers may be provided and the amount of light radiated from the end closest to the amplifier should be controlled so as to be of a suitable radiation density to comply with above described relevant safety standards, and yet at the same time is sufficiently high that power is still being radiated from the fibre at the end remote from the amplifier. This may require a continuous amplification system or amplifiers spaced along the length of the fibre.

In addition to this, by providing backward scattering of the radiated light (ie, making the scattering more Lambertian) the possibility of focusing sufficient light to harm a human can be further reduced and yet the amount of radiation overall radiated can be sufficiently large to be useful.

Such an optical communication system has widespread uses. For example, an optical fibre including such an arrangement may be provided across the ceiling of a room and it may be arranged so as to provide a diffuse pattern of light into the room, which light will carry a signal which may be picked up and utilised, for example, by radiation receivers forming part of televisions or computers which are thereby not directly connected to a signal source by hard wire. This is particularly convenient in auditoria, corridors, temporary rooms, and rooms of an unusual shape. Such an arrangement is particularly convenient as the televisions or computers may be moved around the room and continue to receive the signal. Also because of the use of light, the band width is increased allowing simultaneous transmission of many signals.

Such an arrangement may also be used to transmit, for example, a signal such as a television signal remotely to one or more buildings.

In this specification the term "optical" and "light" are intended to refer to that part of the electromagnetic spectrum which is generally known as the visible region together with those parts of the infrared and ultraviolet regions at each end of the visible region which are capable, for example, of being transmitted by dielectric optical waveguides such as optical fibres.

BRIEF DESCRIPTION OF THE DRAWINGS

Preferred embodiments of the invention will now be described by way of example only and with reference to the accompanying drawings in which.

DETAILED DESCRIPTION OF EXEMPLARY EMBODIMENTS

Figure 1:
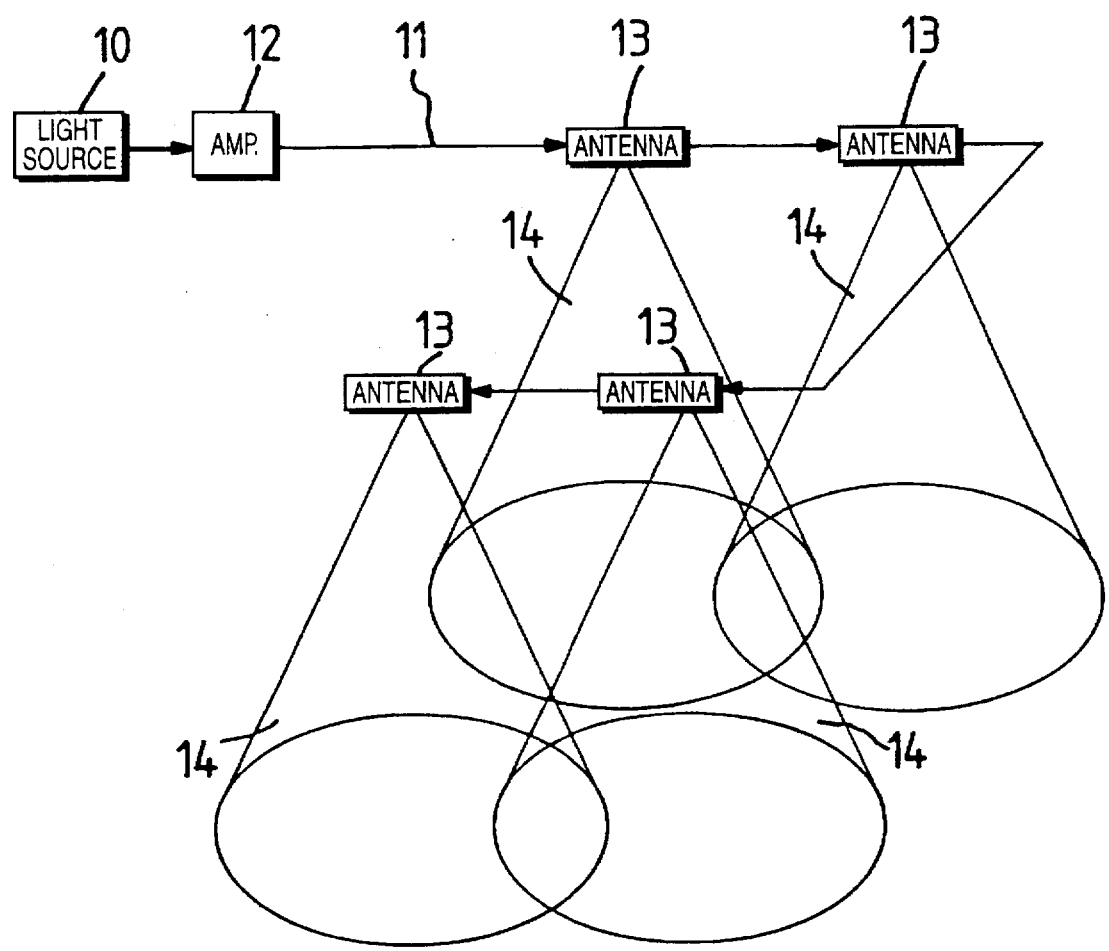
FIG. 1 is a diagrammatic view of a first apparatus according to the invention.

Referring to FIG. 1, there is shown diagrammatically an optical communication system according to the invention which comprises a source 10 of light, light being passed by the source into an optical fibre 11. The source 10 can be a generally conventional source of optical light (usually of infra-red wavelength) which carries signal information and the optical fibre 11 may be of generally conventional construction and includes one or more discrete amplifiers 12 or an amplifier which is distributed along the fibre itself.

Figure 2:
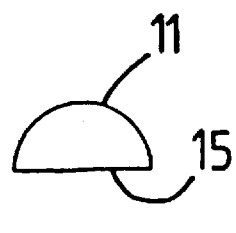
FIG. 2 is a transverse section of a first arrangement of optical fibre in the region of a transmit means of FIG. 1.

The optical fibre includes antenna means 13 at spaced intervals along its length. The antenna means 13 comprises an extensive length of the optical fibre 11 which may be arranged so that light from within the fibre passes out of the fibre into free space. This may be done in a preferred arrangement by providing a length of the fibre formed as a "D-fibre" (the cross-section of which is shown in FIG. 2), that is, the cross section of the fibre is reduced from its normally circular cross section to a semi circular cross section by a transverse bisecting flat or planar surface 15. Such a construction is well known as a technique for removing light from the fibre and passing it to, for example, another fibre in contact therewith. However in the present instance, such an arrangement is used to allow light to leak from the fibre 11 into free space.

It may be useful to provide typical values of the components described so far. Thus the antenna means 13 may be in the form of optical fibre of between 1 and 100 meter length, and the amount of light transmitted may be between 10 mW and 1 W. In a typical arrangement, the source 10 may be in the form of a laser which may provide 10 mW, or 40 mW power. Thus if the transmit means 13 comprises a 1 meter length of fibre, and it is desired to transmit 10 mW of power, then if the laser has a power output of 40 mW then the coupling between the core of the fibre and free space must be arranged so as to transmit a quarter of the power of the laser from the fibre evenly along that length of fibre.

As is well known, the so called "D"-fibre comprises a circular central core which is typically between 8 μm and 10 μm in diameter, of a glass of refractive index of the order of 1.454, surrounded by the D cross section cladding of glass of refractive index of 1.444 and of a diameter of about 125 μm. This glass cladding is surrounded by a coating of plastic (polymer) of a refractive index so as to allow light from within the cladding to spill into the coating, and the coating can have a typical diameter of between 250 and 400 μm, typically 350 μm.

Figure 11:
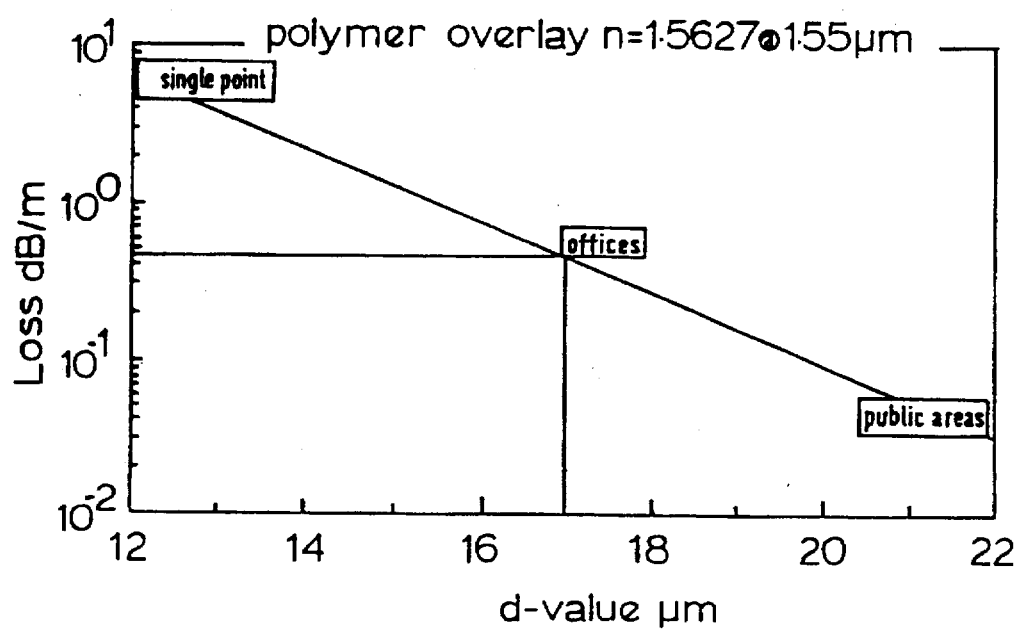

The d-value (the distance in μm from the periphery of the fibre core to the flat face) and/or the refractive index of the coating can be chosen to vary the power to be radiated from the fibre, and might be for example between about 1 and 25 μm. For D-fibre matching standard system fibre and a coating index of 1.584 (at 589 nm), d-values have been calculated which would provide fibre light losses of 0.05 dB/m, 0.5 dB/m and 10 dB/m for use in various regimes. Thus for application of the optical communication system to a gallery or public area in which the distance might be 500 m, the light loss required would be of the order of 0.05 dB/m and this requires a d-value of about 22 μm. In the case of application to offices, where the distance might be 50 m, a light loss of 0.5 dB/m would be typical and this will require a d-value of about 17 μm. For a single emitter where the distance would be of the order of 5 m, a light loss of approximately 10 dB/m may be required which requires a d-value of approximately 11 μm. FIG. 11 illustrates the relationship in general terms between the loss of light per unit length along the fibre against d-value and the type of use which the different loss fibres would be applicable for a D-fibre of the values set out. These calculations have shown that the D-fibre type can be chosen to suit run-lengths of a few meters for point source applications, tens of meters for office environments and hundreds of meters for airport lounges or railway termini. (The light is required to leak out slowly, for long fibre runs, to maintain sufficient power along the length, whereas in the office environment the power can be released over a shorter distance.) D-fibre can be made using any of these values with no additional complexity in the manufacturing technique.

These results indicate that the using a large area photodiode (50 mm sq) with a dynamic range of 20 dB and a sensitivity of −30 dBm and a laser diode of 20 dBm should provide a performance better than 16 Mbit/s, for a non wavelength division multiplexed system (7).

Such values of d, refractive index, and diameters will be typical of the D-fibres described throughout this specification.

In practice, in designing such a system, the starting point will be the relevant safety standard and this, when transmitted into the distance between a person and the transmit means, and the length of the transmit means, will indicate laser power required, and the efficiency of coupling between the fibre core and free space which is required in a particular circumstance.

Figure 3:
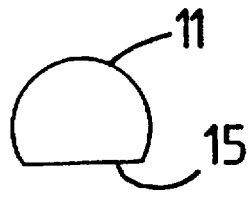
FIG. 3 is a transverse section of a second arrangement of optical fibre in the region of a transmit means of FIG. 1.

If it is desired to allow escape of a lesser amount of light per unit length, the cross section may be greater than semi circular as shown in FIG. 3, ie, the transverse surface 15 may be spaced from the longitudinal axis of the fibre 1 so that less material is removed from the fibre.

Whilst an arrangement as above described would work satisfactorily in many instances, because the light is passing down the fibre axially, although it leaks out from the fibre 11 into free space, it tends to form a cone around the axis of the fibre and the angle of the cone is not necessarily very great. It is desirable, and indeed may be in some circumstances essential to have a cone angle which is greater than that which would be provided by a simple D-fibre and thus steps are taken to provide more scattering of the light from the fibre.

Figure 4:
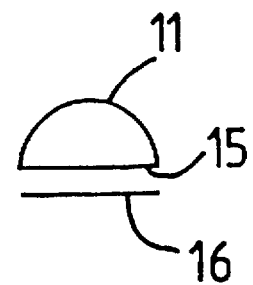
FIG. 4 is a transverse section of a third arrangement of optical fibre in the region of a transmit means of FIG. 1.

As shown in FIG. 4, there may be provided on or adjacent to the D-fibre section, means which we refer to as diffuser means 16 which provides a predetermined diffuse pattern of radiated light, and this diffuser means 16 may be in the form of scattering lenses (which may be formed, for example, of moulded plastic or may be formed by spraying transparent material onto the transverse flat surface 15, allowing the individual droplets to set and form lenticular elements which may be of random different focal lengths), a diffuse screen (which may be formed separately or may comprise a suitably roughened transverse flat surface 15), refractive lenses, or one or more holographic elements. Details of a holographic element suitable to the purpose is described in our copending EP 580 905A.

Alternatively, the transmit means 13 may comprise scattering centres on a round fibre, or coatings on a D-fibre with scattering centres as will be described later.

By virtue of the length of the exposed optical fibre 11 in the transmit means 13 and/or by virtue of the diffuser means 16 which, as is illustrated in the Figures, scatters the light at an angle of more than 90° to the direction of passage of the light signal along the fibre, the effect is to create a diffuse distribution pattern of radiated light in free space which cannot be focused on to the retina or skin of a person with a lens in a manner such that the retina or skin can be damaged.

The transmit means 13 can be arranged to radiate light into free space in a diffuse manner but in a predetermined pattern as is indicated at 14. The patterns may overlap or be separated as is desired. In a particular arrangement, the optical fibre 11 may be arranged to traverse the ceiling of a room and patterns 14 covering the room may be provided.

Whilst we have referred to a plurality of separate transmit means spaced along the optical fibre, in certain circumstances it will be desirable to provide a long length of D-fibre and an optional associated diffuser element, to provide a lengthy transmit means. Indeed, the whole of the optical fibre may be in the form of D-fibre so that a transmitter means is provided along its total length. Any of the thus far described arrangements of the invention may be used in this way.

Figure 5:
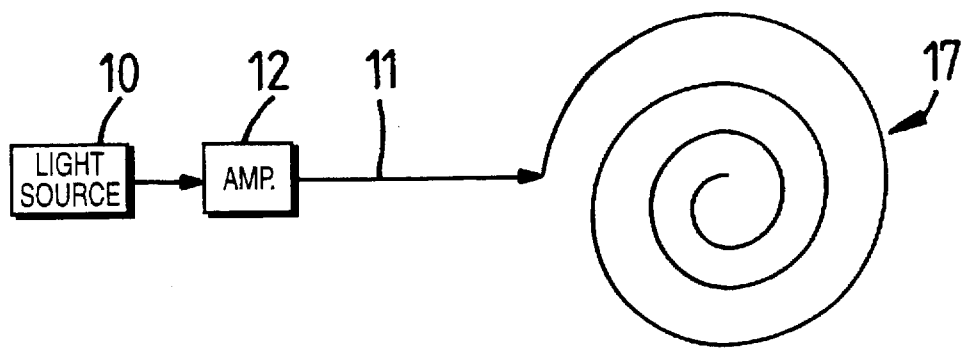
FIG. 5 is a diagrammatic view of a second apparatus according to the invention.

In FIG. 5, it will be seen that there is provided an arrangement similar to FIG. 1 except that in place of separate transmit means, there is provided a single transmit portion 17 which is arranged in spiral form at the end of the optical fibre of D-fibre from which light is radiated from inside the fibre 11 into free space.

In the arrangement of FIG. 1 the power level in the fibre 11 will generally drop exponentially along the length of the feeder run. This can be compensated by adjusting the dynamic range of the optical receivers associated with the respective transmitters 13, or by saturating the feeder 11 with optical power from the source 10 and amplifier 12. Another possibility would be to use binary related transmit means along the fibre 11 such that the amount of power that can be leaked at each transmit means 13 is progressively increased by a factor of 2. To avoid having a very high power source at one end of the feeder, it would also be possible to have a half power source at each end.

Figure 6:
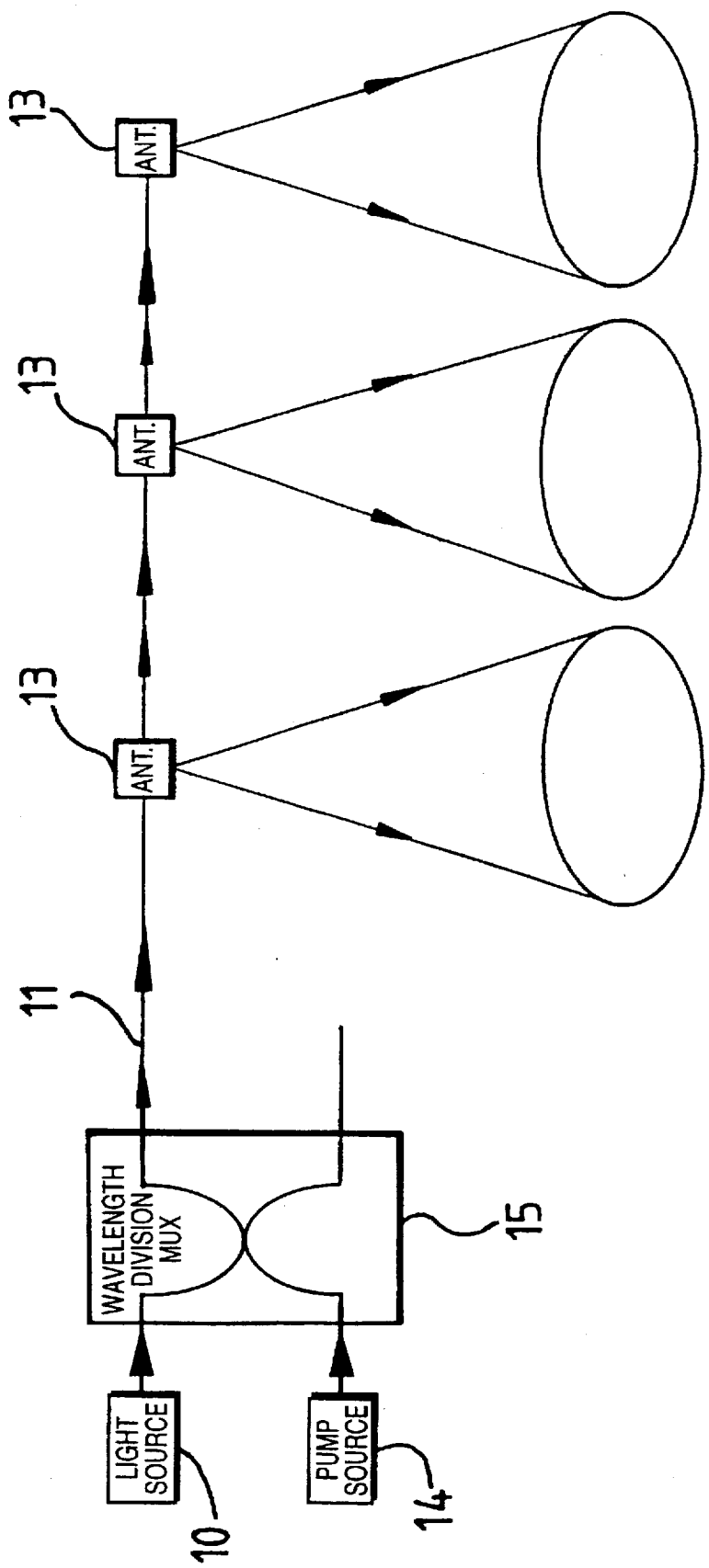
FIG. 6 is a diagrammatic view of a third apparatus embodying the invention.

A further arrangement for achieving more equal power distribution along the feeder 11 is shown in FIG. 6 where like parts are denoted by the same reference numerals.

In the arrangement of FIG. 6, the feeder run 11 consists of an optical fibre doped with erbium ions, or with any dopant that produces optical amplification. It is then possible to pump the fibre at a shorter wavelength than the signal wavelength to excite the ions and thereby amplify the signal as it travels along the fibre. For example, a fibre doped with erbium ions and carrying a signal at 1500 nm could be doped at a wavelength of 980 nm. The 1500 nm signal is then coupled from the fibre at each tapping 13 while the pump power at 980 nm is retained by the fibre for optical amplification. In this way, the signal strength can be maintained over an indefinite length.

The signals from the pump source 14 and the signal source 10 are coupled to the fibre 11 through a wavelength division multiplexer 15. By suitable choice of pump powers, doping densities, and rates at which the signal power is coupled out of the feeder, the distribution of coupled power along the feeder can be made essentially uniform.

Figure 7:
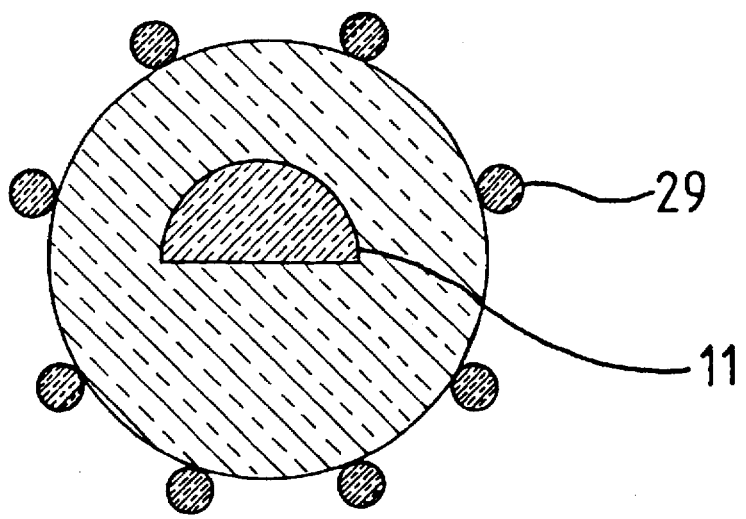
FIG. 7 is a transverse section of a fourth arrangement of optical fibre.

FIG. 7 shows a transverse section of a fourth embodiment of fibre for use with the invention.

Optical fibres are prone to breakage if put under tension, and it has become a well known technique to install optical fibres in a system by initially installing a conduit for the fibre which may be in the form of a tube. The conduit is of material which is not damaged by the inevitable bending and pulling which accompanies installation. Once the conduit has been suitably mounted, the optical fibre is fed along the conduit by means of a flow of air. Such a method is described in EP 0108590B. To assist in this process, it is known to provide on the outer surface of the optical fibre a coating of tiny glass beads (referred to as "ballotini") which has the effect of increasing the coupling between the flow or air and the fibre and improves the movement of the fibre through the conduit. Such a fibre unit and method for its preparation are described in our copending PCT Patent application WO93/01512 herein incorporated by reference.

We have discovered that there is a remarkable coincidence of mechanical and optical properties of the tiny glass beads in that they may be used to scatter light out of the optical fibre. Hollow ballotini are preferable for this application because they have the added advantage of greater scattering effect (more changes of refractive index are experienced by the light).

In use, ballotini (of diameter between 3 and 18 μm) are mixed with coating material having the same refractive index as the UV coating and are used to thinly coat a D-fibre (typically 82 nm D-fibre) substrate. FIG. 7 shows a cross section of the optical fibre thereby coated.

Where the apparatus is to be used in a distributed light system, a desired arrangement of transparent conduits is mounted across the ceiling of the room into which the light is to be transmitted.

The D-fibre is then blown into the conduit across the ceiling as described. The D-fibre orientation varies randomly along the transparent conduit and up to 50% of the available light is directed away from the useful direction for example towards the ceiling. Much of this wasted power can be regained by using a reflector behind the conduit.

Figure 10:
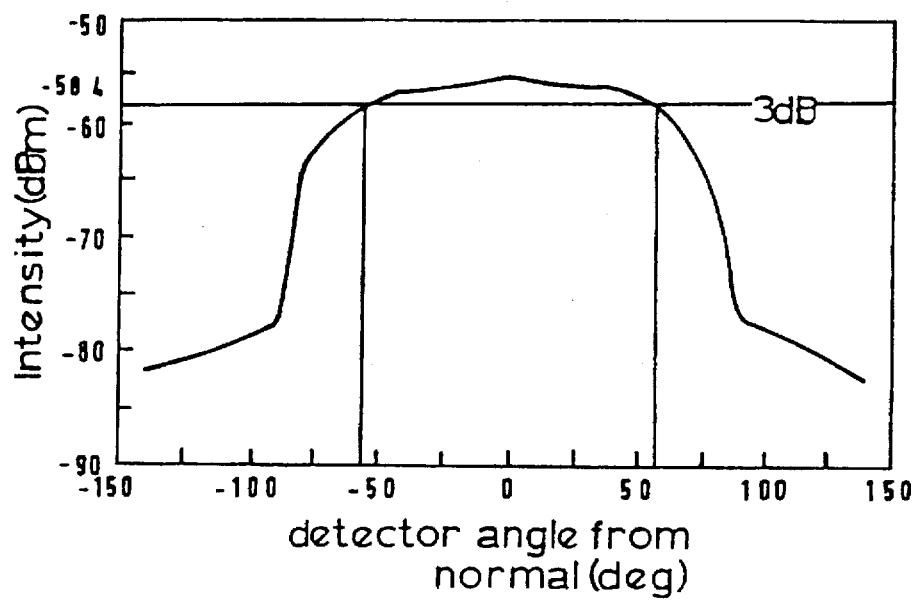
FIG. 10 is a graph of intensity detected by detector, against the detector angle from the normal around a fibre, and, FIG. 11 is a graph of the d-value in μm against the loss in dB/m for a D-fibre.

In a test, a 1300 nm, 1 mw diode laser beam was launched into the D-fibre and a photo-diode was rotated radially around it to determine angles from the normal. FIG. 10 shows the results of these measurements.

According to our calculations from the test results, assuming the D-fibre is blown into a transparent ceiling conduit at a height of 2.5 m, the arrangement provides illumination with a 3 dB dynamic range at a desk height in an area 5 m wide. The leakage rate is completely uniform along the fibre run direction.

The d-value (the distance in μm from the periphery of the fibre core to the flat face) and/or the refractive index of the primary coating, can be altered to vary the power to be radiated from the fibre. For D-fibre matching standard system fibre and a primary coating index of 1.584 (at 589 nm), d-values have been calculated which can provide fibre light losses of 0.05 dB/m, 0.5 dB/m and 10 dB/m for use in various situations. These calculations have shown that the D-fibre type can be chosen to suit cable run-lengths of a few meters for point source application, tens of meters for office environments and hundreds of meters for airport lounges or railway termini.

Figure 8:
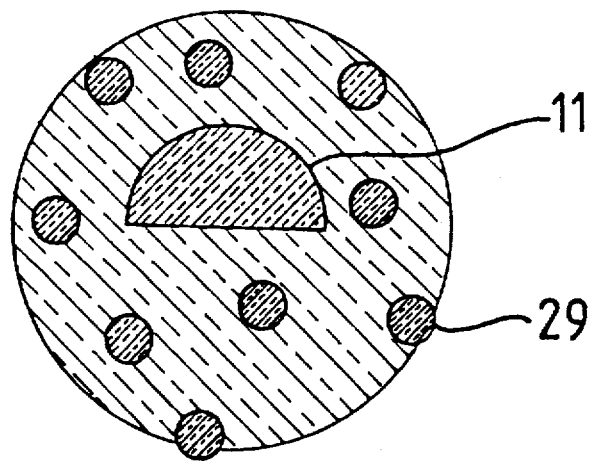
FIG. 8 is a transverse section of a fifth arrangement of optical fibre.

In the arrangement shown in FIG. 8, the ballotini are scattered throughout the fibre coating as well as towards the outside edge. This provides scattering from within the coating.

Figure 9:
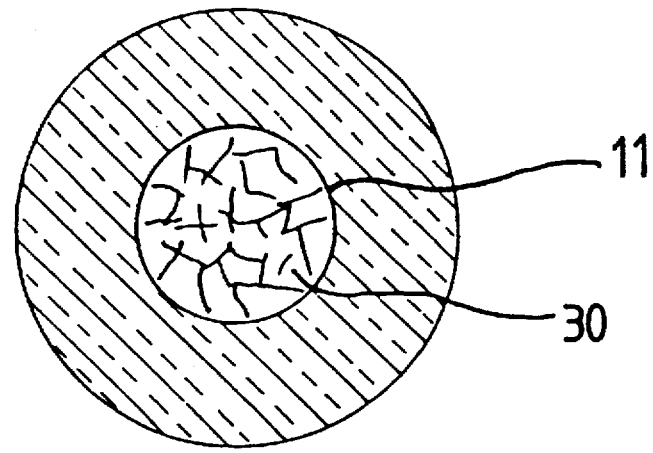
FIG. 9 is a transverse section of a sixth arrangement of optical fibre.

In the arrangement of FIG. 9, there is provided a special fibre which has a much higher Rayleigh scattering coefficient than normal. The scattering properties of the fibre are enhanced by growing small crystals in the fibre core or by forming the fibre itself from a highly and multiply doped silica glass. Thus such a fibre (which need not be a D-fibre) may be used to provide a leaky feed over 500 meters which scatters light out of the fibre at a rate of 40 dB/km. The small crystals in the fibre core may be produced by controlled reheating of an optical fibre (or by slowing cooling the optical fibre after manufacture) through a temperature band between the glass transition temperature $T_G$ and the crystallisation temperature $T_X$ of the glass in question. A typical temperature band would be of the order of 500° to 1000° C. and, depending upon the glass, the glass should be maintained in the desired temperature band for a period of time between less than one minute and one hour, typically one to two minutes.

Each of the arrangements described with reference to FIGS. 7 to 9 provides scattered light in a rearward direction with respect to the direction of the light along the fibre.

In another arrangement a length of D-fibre was fusion-spliced to the tail of a semiconductor communication laser of wavelength 1500 nm. A silicon microlens array measuring 1 cm² and containing 6400 lenses on a 250 μm grid was placed, in optical contact, on to part of the D-fibre flat. The light emitted by the panel of microlenses is symmetrically distributed normal to the panel and spatially incoherent. The power thus distributed can therefore be higher, before safety considerations impose a limit, than is the case for direct laser or LED distribution. The power emission lobe has a 38°, 3 dB half angle. In fact, 80% of the input power from the laser diode was detected in the output lobe. It is calculated that this would transmit signals over a 4 m width at desk level, from a ceiling height of 2.5 m.

Quasi-continuous illumination could therefore be obtained by placing a microlens array every 4 m along a cable run, spliced or connected into the transmission path. It is easy to imagine continuous distribution from suitably coated fibre, installed as a continuous length into a transparent conduit. This installation might be conveniently effected by the blown fibre technique for installing fibre into preinstalled conduit.

If the light is being radiated along an extensive length of fibre, for example 2 meter, then the proportion of the light passing out of the fibre within a 5 cm aperture will be 5/200 of the total light, although it is understood that there would be a greater amount of light transmitted from the fibre at the source end rather than the end remote from the source. This makes for inherent safety.

The arrangement of this invention has a multiplicity of uses.

For example, in an office environment, the light transmitter may be provided in the form of the fibre 11 extending across the ceiling of a room, and a signal from the fibre 11 carrying broadcast information may be transmitted into the room from where it may be picked up by, for example, suitable receivers (such as light sensitive semiconductor elements) forming part of computers (such as portable computers) or televisions.

The apparatus of the invention is particularly useful in circumstances where, for example, the information is either broadcast as above described or where there is considerably more information to be broadcast to the terminal than from the terminal. For example in an airline terminal or travel agent's office, it is necessary for each terminal to be able to access a lot of information about all of the timetables for a particular airline or whatever but the information which the terminal itself needs to send to the database is not great. Thus a very simple solid or radio link can be provided between the terminal and the database which can pass the necessary interrogation information at a relatively slow rate, but the data which the terminal requires to answer the particular question can be considerable and this can be transported by a system of the invention at a very high data rate.

It is generally not necessary for the receiver of the television or computer to have a direct line of sight with the antenna means (13) but light reflected from other surfaces may be sufficient to provide sufficient signal to the television or computer receiver.

In another arrangement, an optical communication system in accordance with the invention may be provided remotely from houses or buildings and broadcast information, for example, television signals, may be broadcast to the houses or buildings from a remote location to be received by receivers.

Furthermore, the arrangement of the invention may be used in the common situation inside a theatre where an audio signal is impressed upon the light within the fibre and may be transmitted to a suitable headset.

The invention is not restricted to the details of the foregoing example.

We claim:

1. An optical communication system for free space communication comprising:

an optical source including means to modulate the optical output to provide an optical signal, said optical source being connected to an optical fibre to pass said signal therealong, the optical fibre including antenna means including an optical fibre transmit portion having a core and a cladding;

said cladding of said optical fibre transmit portion including a flat surface extending along its length and means to couple light out of the optical fibre through said flat surface, and scattering means to incoherently scatter into free space light thus coupled out of the fibre; and a plurality of said antenna means being provided at spaced intervals along the optical fibre.

2. An optical communication system as in claim 1 wherein each said optical fibre transmit portion includes a coating surrounding said cladding.

3. An optical communication system as in claim 2 wherein the distance between said core and said flat surface and the relative refractive indices of the cladding and the coating is such that said optical signal from each optical fibre transmit portion is scattered into free space to provide incoherent scattered light outside the fibre.

4. An optical communication system as in claim 1 wherein at each antenna means light from within the optical fibre is scattered through an angle of more than 90° to the direction of passage of light along the fibre.

5. An optical communication system as in claim 1 wherein each antenna means includes means to further incoherently scatter the light into free space.

6. An optical communication system as in claim 5 wherein each said further scattering means includes a diffuser in the form of a diffuse screen or scattering lens elements.

7. An optical communication system as in claim 6 wherein said scattering lens elements are lenticular elements include sprayed transparent material on at least one of said at least one flat surface with individual droplets of the sprayed material being set thereonto.

8. An optical communication system as in clam 5 wherein each said further scattering means comprises glass beads.

9. An optical communication system as in claim 8 wherein the glass beads have diameters in the range of 3 to 18 μm.

10. An optical communication system as in claim 2 wherein the coating is transparent to said light and said glass beads are provided within the coating or on the outer surface or the coating of both.

11. An optical communication system as in claim 5 wherein each said further scattering means comprises irregularities in the core of the fibre.

12. An optical communication system as in claim 11 wherein the irregularities comprise crystals within the fibre core which provide Rayleigh scattering.

13. An optical communication system as in claim 5 wherein each said further scattering means comprises a holographic element.

14. An optical communication system as in claim 13 wherein said holographic element is formed on at least one of said flat surfaces of said fibre.

15. An optical communication system as in claim 1 wherein successive spaced optical fibre transmit portions are arranged so as to transmit an increasing proportion of the available light in the fibre.

16. An optical communication system as in claim 1 wherein each optical fibre transmit portion is between 1 to 100 m in length.

17. An optical communication system as in claim 1 wherein each optical fibre transmit portion is between 1 and 10 m in length.

18. An optical communication system as in claim 16 wherein the optical source is arranged to transmit an optical signal of 10 mW to 1 W along the optical fibre.

19. An optical communication system as in claim 1 wherein the optical fibre includes a dopant capable when stimulated of amplifying the signal from the source as the signal travels along the fibre.

20. An optical communication system as in claim 19 wherein the optical source and a pump source are connected to the fibre through a wavelength multiplexer, the pump source providing a signal at a shorter wavelength than the signal from the optical source to stimulate the dopant in the fibre.

21. An optical communication system as in claim 1 wherein the source is a laser having a power output up to 200 mW and the light transmitted from the optical communication system is arranged so that it is not possible, with a lens of up to 50 mm diameter, to focus the light to provide an energy density sufficient to damage a human as defined.

22. An optical communication system as in claim 1 wherein the distance (d) between the periphery of said core and said flat surface of the cladding is between 1 and 10 μm.

23. An optical communication system as in clam 22 wherein the distance (d) between the periphery of said core and said flat surface of the cladding is approximately 5 μm.

24. An optical communication system as in claim 1 wherein said cladding is surrounded by a coating of diameter in the range 250 to 400 μm.

25. An optical communication system as in claim 24 wherein said cladding is surrounded by a coating of diameter in the range approximately 350 μm.

26. An optical communication system for free space communication comprising:

an optical source, including means to modulate the optical output to provide an optical signal, said optical source being connected to an optical fibre to pass said signal thereto, the optical fibre including signal transmit means having an optical fibre transmit portion with a core and cladding, the core including optically effective irregularities whereby some of said optical signal from the optical fibre transmit portion is scattered through the cladding to provide incoherent scattering into free space outside the fibre; and a plurality of optically effective irregularities at spaced intervals along the optical fibre.

27. An optical communication system as in claim 26 wherein said irregularities comprise small crystals within the fibre core which provide Rayleigh scattering.

28. An optical communication system comprising:

an optical fibre adapted to be coupled to a source of optical signals;

said optical fibre including at least one portion having a D-shaped cross section disposed to progressively radiate a portion of said optical signal therefrom; and a light diffusing structure disposed to incoherently scatter said radiated optical signal into free space.

29. An optical communication system as in claim 28 comprising a plurality of said optical fibre portions having D-shaped cross section at spaced intervals along the optical fiber.

30. An optical communication system as in claim 28 wherein said light diffusing structure includes a fibre coating.

31. An optical communication system as in clam 30 wherein said fibre coating further comprises glass beads embedded therein.

32. An optical communication system as in claim 28 wherein said light diffusing structure comprises glass beads embedded within a cladding layer of the fibre.

33. An optical communication system as in claim 28 wherein said light diffusing structure comprises transparent material sprayed onto said fibre so that droplets of the material adhere to said fibre.

34. An optical communication system as in claim 28 wherein said light diffusing structure comprises irregularities within the fibre core.

35. An optical communication system as in claim 29 further including means for causing approximately equal amounts of optical power to be radiated by each successive radiation portion of the fibre.

* * * * *